United States Patent
Ando

(10) Patent No.: US 7,551,986 B2
(45) Date of Patent: Jun. 23, 2009

(54) PROGRAM DISTRIBUTION SYSTEM, PROGRAM DISTRIBUTION DEVICE, AND IN-VEHICLE GATEWAY DEVICE

(75) Inventor: Toshihide Ando, Chita-gun (JP)

(73) Assignee: Denso Corporation, Kariya (JP)

( * ) Notice: Subject to any disclaimer, the term of this patent is extended or adjusted under 35 U.S.C. 154(b) by 871 days.

(21) Appl. No.: 11/063,414

(22) Filed: Feb. 23, 2005

(65) Prior Publication Data
US 2005/0187674 A1    Aug. 25, 2005

(30) Foreign Application Priority Data

Feb. 24, 2004 (JP) ............... 2004-047802
Apr. 2, 2004 (JP) ............... 2004-109980

(51) Int. Cl.
B62B 1/00 (2006.01)
(52) U.S. Cl. ............... 701/1; 701/36; 701/29
(58) Field of Classification Search ............ 701/1, 701/29–36, 101–116; 707/8, 9; 700/2, 23, 700/24
See application file for complete search history.

(56) References Cited

U.S. PATENT DOCUMENTS 5,541,840 A * 7/1996 Gurne et al. ............... 701/33
7,191,040 B2 * 3/2007 Pajakowski et al. ......... 701/1
2002/0193926 A1 12/2002 Katagishi et al.
2003/0182034 A1 9/2003 Katagishi et al.
2004/0210363 A1 10/2004 Katagishi et al.

FOREIGN PATENT DOCUMENTS

| JP | 2002-334166 | 11/2002 |
|---|---|---|
| JP | 2003-084978 | 3/2003 |
| JP | 2003-132030 | 5/2003 |
| JP | 2003-216220 | 7/2003 |

OTHER PUBLICATIONS

Office Action dated Aug. 18, 2008 in Japanese Application No. 2004-047802.
Notification of Reasons for Refusal dated Oct. 7, 2008 from the Japan Patent Office in the corresponding patent application No. 2004-109980.
Office Action dated Sep. 30, 2008 in Japanese Application No. 2004-047802.

* cited by examiner

Primary Examiner—Richard M. Camby
(74) Attorney, Agent, or Firm—Harness, Dickey & Pierce, PLC

(57) ABSTRACT

According to a request from a gateway device in a subject vehicle, a program distribution device designates a program that conducts an access to an ECU in the subject vehicle and associated with vehicular information of the subject vehicle on a table where vehicular information and programs are previously associated. The designated program is distributed to the gateway device along with an access right identifier defining an access right to the given ECU, and an electronic signature. When the gateway device determines that the received electronic signature is valid, the gateway device sets, to the received program, an access right to the ECU based on the distributed access right identifier.

13 Claims, 6 Drawing Sheets

PROGRAM DISTRIBUTION SYSTEM, PROGRAM DISTRIBUTION DEVICE, AND IN-VEHICLE GATEWAY DEVICE

CROSS REFERENCE TO RELATED APPLICATIONS

This application is based on and incorporates herein by reference Japanese Patent Applications No. 2004-47802 filed on Feb. 24, 2004, and No. 2004-109980 filed on Apr. 2, 2004.

FIELD OF THE INVENTION

The present invention relates to a program distribution system that distributes to a vehicle a program that is used for conducting an access to a vehicular electronic control unit (vehicular ECU), and further relates to a program distribution device, and an in-vehicle gateway device.

BACKGROUND OF THE INVENTION

There is known Open Service Gateway Initiative (OSGI) Frame Work that is a technology for a program distribution device to distribute a specific program to a gateway device. Here, the gateway device designates a program; the program distribution device distributes the designated program to the gateway device. When this technology is directed to a vehicle, there is a case that a program distribution device distributes to an in-vehicle gateway device a program that conducts an access to a vehicular electronic control unit (vehicular ECU).

Here, this vehicular ECU is differentiated into various kinds based on vehicle information such as vehicle kinds and model years, even if the same function is contained in the vehicular ECU. Therefore, the program distribution device needs to able to distribute the program that is handled by the in-vehicle gateway device without any problem even if the in-vehicle gateway device connects with any kind of the vehicular ECU. However, development required for this necessity becomes extremely wide-scaled to thereby pose a first problem.

Furthermore, when the program for conducting an access to a vehicular ECU is distributed from a program distribution device to an in-vehicle gateway device, there is a risk that the program is forged or altered by a third party or unauthorized person while being distributed. This possibly causes an unauthorized access to the vehicular ECU to thereby pose a second problem or significant obstruction against traveling of the vehicle. To solve the second problem, only the programs developed and verified by trusted developers can be distributed from the program distribution device to the in-vehicle gateway device. However, in this case, the developers need to be limited, so that programs are limited, accordingly. Otherwise, security that prohibits an access to the vehicular ECU can be adopted so that the program cannot be executed in the condition that the security is not secured. However, this poses another problem that no access to the vehicular ECU is practically allowed.

SUMMARY OF THE INVENTION

It is a first object of the present invention to provide a program distribution system, a program distribution device, and an in-vehicle gateway device that are capable of solving the above first problem and the like. Namely, they are capable of distributing a proper program to an in-vehicle gateway device.

Further, it is a second object of the present invention to provide a program distribution system and an in-vehicle gateway device that are capable of solving the above second problem and the like. Namely, they are capable of helping prevent a distributed program from conducting an unauthorized access to a vehicular ECU, so that reliability of the program can be properly secured.

To achieve the above first object and the like, a program distribution system is provided with the following. A program distribution device is included for distributing one of a plurality of programs for conducting an access to a vehicular ECU. An in-vehicle gateway device provided in a vehicle is included for receiving the distributed one of the programs. Here, the program distribution device includes a table where the plurality of programs and a plurality of vehicular information items are associated. The vehicular information items include at least one of a vehicle kind, a model year, and a vehicle grade. When a program distribution request is sent from the in-vehicle gateway device, the program distribution device designates a program associated with a vehicular information item of the vehicle and reads out the designated program from the table to send the read program to the in-vehicle gateway device.

Under this structure, the program distribution device can distribute a program that is based on vehicle information of a vehicle mounted with the in-vehicle gateway device even if the in-vehicle gateway device connects to any kind of vehicular ECUs. This enables a proper program to be distributed to the in-vehicle gateway device.

Further to achieve the above second object and the like, a program distribution system is provided with the following. A program distribution device is included for distributing a program conducting an access to a given ECU of a plurality of ECUs provided in a vehicle, and an identifier that defines an access right to the given ECU. A gateway device that is provided in the vehicle is included for receiving the distributed program and the distributed identifier. Here, the program distribution device distributes, along with the program and the identifier, an electronic signature that is generated based on the program and the identifier by using a cryptography and enables the gateway device to confirm that the program and the identifier are distributed without being altered from the program distribution device. The gateway device determines a validity of the received electronic signature. When the validity of the electronic signature is affirmatively determined, the gateway device sets, to the received program, an access right to the given ECU, and prohibits the received program from conducting an access to other ECUs excluding the given ECU, based on the received identifier.

Under this structure, a program is distributed to a gateway device along with an identifier for defining an access right to a given ECU of the multiple ECUs provided in the subject vehicle. Therefore, permission or prohibition of the program's access to the ECUs can be properly set based on the received identifier. Further, in this case, the program and the identifier are distributed using the electronic signature from the program distribution device to the gateway device, so that the program and the identifier can be protected from being altered or forged by a third party with a malicious intent during the distribution. This structure thereby helps prevent the distributed program from conducting an unauthorized access to an ECU, to thereby enable reliability of the program to be securely maintained.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
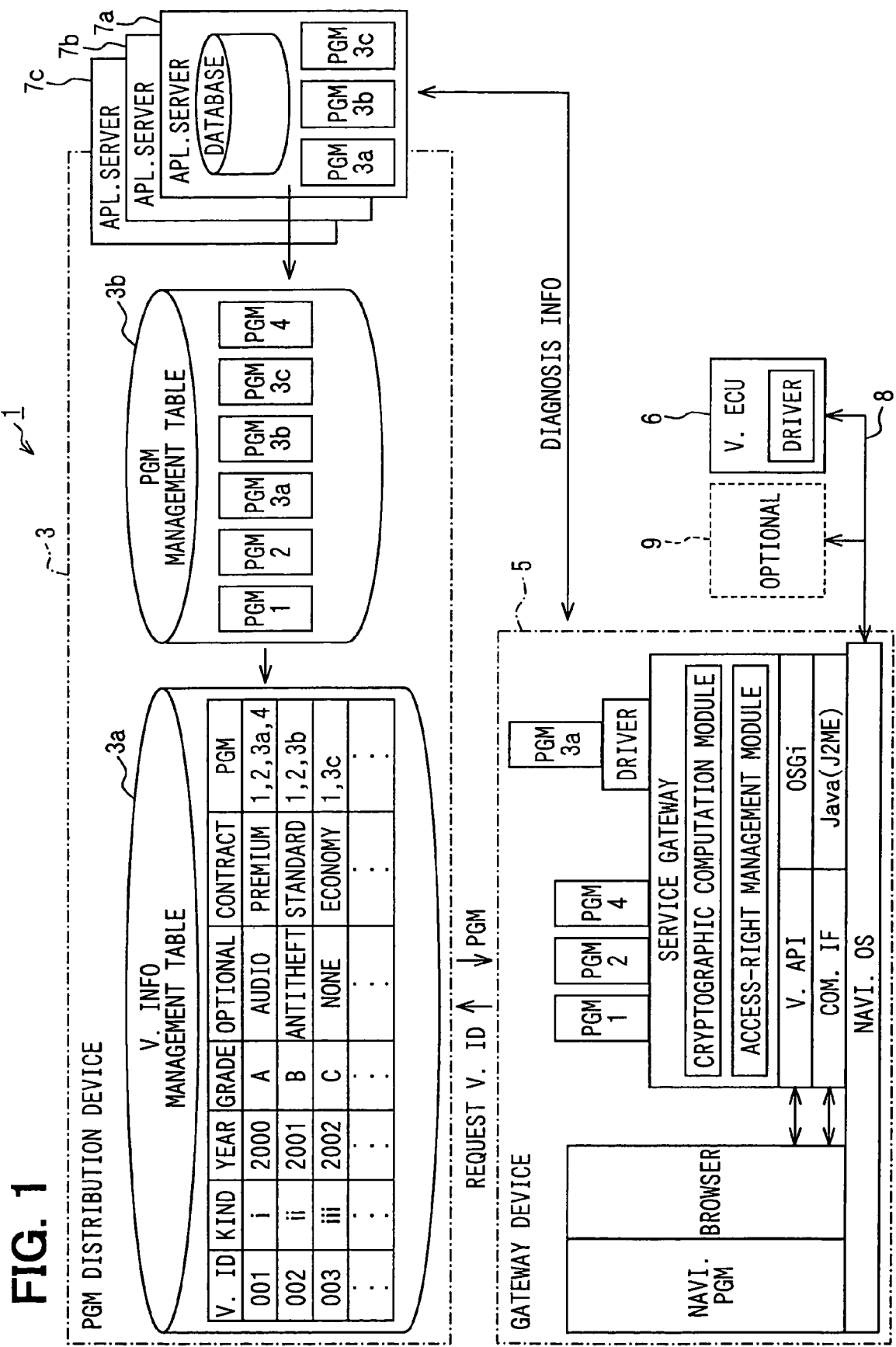
FIG. 1 is a diagram showing a schematic structure of a program distribution system according to a first embodiment of the present invention.

A first embodiment of the present invention will be explained with reference to FIGS. 1, 2, 3. Here, a program means a program for an in-vehicle gateway device or a program execution device to use for an access to a vehicular electronic control unit (vehicular ECU). A program distribution system 1 according to the first embodiment includes a program distribution device 3 provided in a center and an in-vehicle gateway device 5 that is provided in a vehicle as a car navigation device, as shown in FIG. 1.

The program distribution device 3 is used as a distribution server that distributes programs to the in-vehicle gateway device 5 via a cell phone network or a wireless local area network, and has a vehicular information management table 3a and a program management table 3b. The vehicular information management table 3a is a table that manages as a list vehicular information (items) associated with vehicular identifications (IDs) that are individually assigned to vehicles. The program management table 3b is a table that manages as a list programs associated with the vehicular information (items). Here, the vehicular information mean vehicle kinds, model years, grades, optional devices, and user contracts.

When the program distribution device 3 receives a request for distributing a program and a vehicular ID from the in-vehicle gateway device 5, the program distribution device 3 encrypts and distributes the program associated with the vehicular ID, and an access right identifier to the vehicular ECU 6 via a cell phone network or a wireless local area network (LAN) network.

The in-vehicle gateway device 5 connects, via an in-vehicle local area network (LAN) 8, to a vehicular electronic control unit (ECU) 6 as well as an optional device 9 that is able to be connected (attachable) to and disconnected (or detachable) from the in-vehicle LAN 8. Here, the vehicular ECU 6 includes a door ECU, an engine ECU, an air-conditioner ECU, and a meter ECU. Further, the optional device means a device that is able to be connected to the vehicle in the market after the vehicle is shipped from a manufacturing factory, and includes an audio device, an anti-theft device, and a keyless entry system.

When the in-vehicle gateway device 5 receives the encrypted program and identifier from the program distribution device 3, the in-vehicle gateway device 5 decrypts them and sets an access right to the vehicular ECU 6 based on the decrypted identifier. The in-vehicle gateway device 5 thereby permits an access to the vehicular ECU 6 to which the access right is set and to prohibit an access to the vehicular ECU 6 to which an access right is not set.

Here, in this embodiment, the in-vehicle gateway device 5 is composed of the car navigation device, so the program distributed from the program distribution device 3 are executed on an operating system of the car navigation device along with the car navigation program or a browser.

Application servers 7a to 7c in FIG. 1 are managed by an application service provider to send programs to the program distribution device 3. In this case, the functions of the application servers 7a to 7c can be inside the program distribution device 3 or in a separate unit. Further, when the functions of the application servers 7a to 7c are in the separate unit, the application servers 7a to 7c send programs via a cell phone network or a wireless LAN network.

Next, operations of the program distribution system 1 will be explained with reference to FIGS. 2, 3 that show, as overall sequences, data flow among the program distribution device 3, the in-vehicle gateway device 5, and the optional device 9. Further, there is an assumption that the vehicular information is associated with programs managed by the program management table 3b, as shown in the following.

Program 1: Vehicular information (vehicle kind <all>, model year <all>, grade <all>)

Program 2: Vehicular information (vehicle kind <(i),(ii)>)

Program 3a: Vehicular information (vehicle kind <(i)>)

Program 3b: Vehicular information (vehicle kind <(ii)>)

Program 3c: Vehicular information (vehicle kind <(iii)>)

Program 4: Vehicular information (vehicle kind <(i)>, user contract <premium>)

On the other hand, reading ways a program is read out from the program management table 3b are as follows:

(1) First reading way that a program using vehicular information as a key (2) Second reading way that a program using a program number as a key These two reading ways will be explained below.

(1) First reading way that a program using vehicular information as a key

Figure 2:
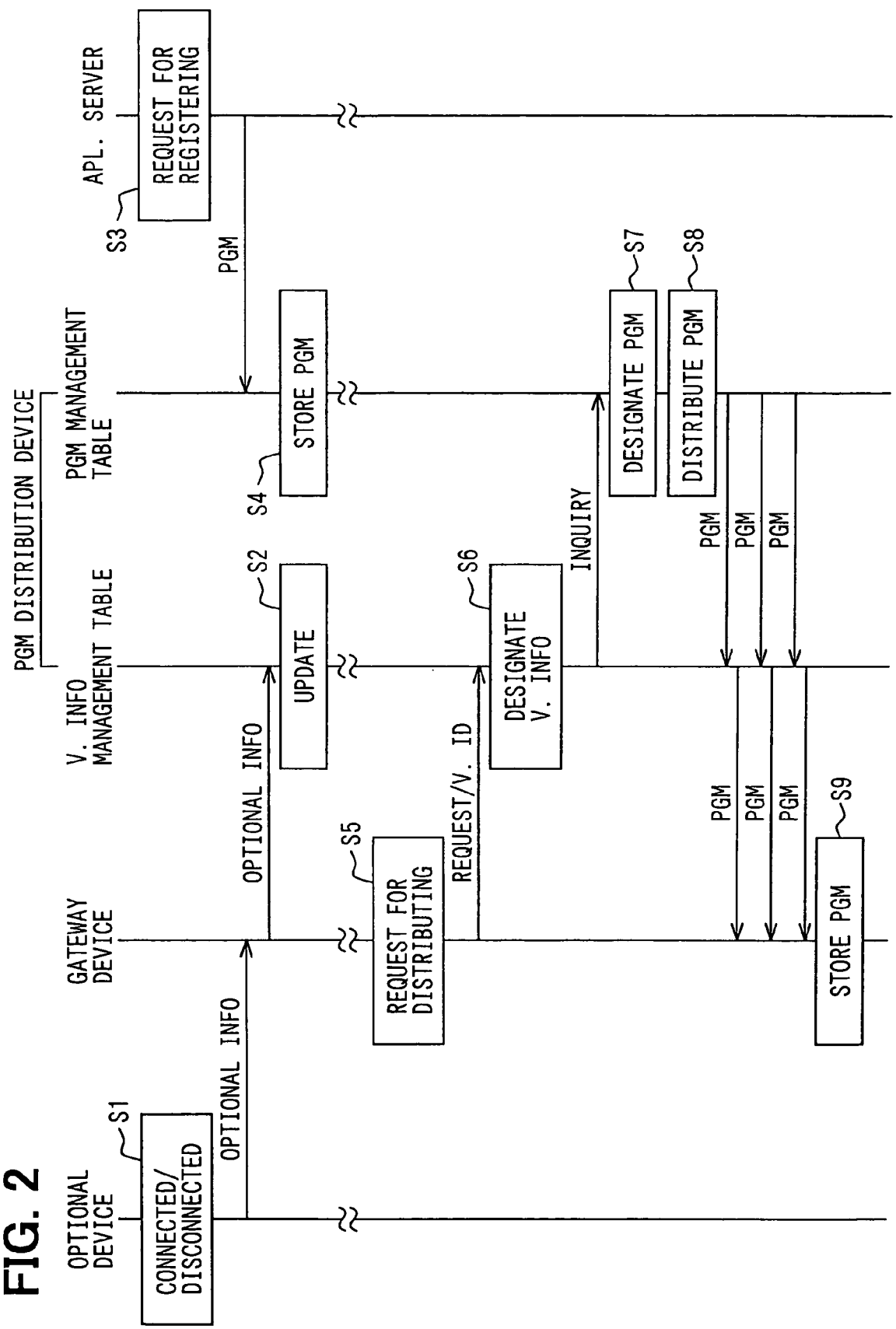
FIG. 2 is a sequence diagram according to the first embodiment.

As shown in FIG. 2, first, the in-vehicle gateway device 5 monitors whether the optional device 8 is disconnected from or connected to the in-vehicle gateway device 5 via the in-vehicle LAN 8. When the optional device 8 is disconnected from or connected to the in-vehicle gateway device 5 (Step S1), the optional device 9 notifies, via the in-vehicle LAN 8, the in-vehicle gateway device 5 of optional device information indicating that the optional device 8 is disconnected or connected. When the in-vehicle gateway device 5 is notified of the optional device information, the in-vehicle gateway device 5 sends the optional device information to the program distribution device 3 via the cell phone network or the wireless LAN network. When the program distribution device 3 receives it, the program distribution device 3 updates information items of the optional device 9 stored in the vehicular information management table 3a based on the received optional device information (Step S2).

On the other hand, when a request for registering a program is generated (Step S3), the relevant application server 7a to 7c sends the program to the program distribution device 3. When the program distribution device 3 receives the program from the application server 7a to 7c, the program distribution device 3 stores the program (Step S4).

Thereafter, when a request for distributing the program is outputted (Step S5), the in-vehicle gateway device 5 sends a vehicular ID as well as the request for distributing the program via the cell phone network or the wireless LAN network to the program distribution device 3. When receiving them, the program distribution device 3 searches the vehicular information management table 3a using the received vehicular ID as a key to designate the corresponding vehicular information items (Step S6). Next, the program distribution device 3 causes the vehicular information management table 3a to notify the program management table 3b of the designated vehicular information items to inquire corresponding programs. The program distribution device 3 then searches the program management table 3b using the vehicular information items as a key to designate the corresponding programs (Step S7).

The program distribution device 3 further reads out the programs corresponding to the vehicular ID from the program management table 3b to distribute the read programs to the in-vehicle gateway device 5 via the cell phone network or the wireless LAN network (Step S8).

In detail, suppose that the vehicle mounted with the in-vehicle gateway device 5 has a vehicular ID of "001." When receiving the vehicular ID of "001" from the in-vehicle gateway device 5, the program distribution device 3 searches the vehicular information management table 3a using the received vehicular ID of "001" to thereby designate the vehicular information items (vehicle kind <(i)>, model year <2000>, grade <A>, optional device <AUDIO>, user contract <PREMIUM>). Next, the program distribution device 3 searches the program management table 3b using the designated vehicular information items to designate the programs (program 1, program 2, program 3a, program 4). Next, the program distribution device 3 reads out those programs 1, 2, 3a, 4 corresponding to the designated vehicular ID of "001" from the program management table 3b to thereby distribute them to the in-vehicle gateway device 5 via the cell phone network or the wireless LAN network.

When receiving these programs, the in-vehicle gateway device 5 stores the received programs and sets an access right to the corresponding vehicular ECU 6 based on the received identifier. The in-vehicle gateway device 5 thereby permits an access to the vehicular ECU 6 to which the access right is set, and prohibits an access to the vehicular ECU 6 to which an access right is not set.

Thus, when receiving the vehicular ID as well as the request for distributing the program from the in-vehicle gateway device 5, the program distribution device 3 associates the received vehicular ID with the vehicular information and then associates the vehicular information with the program. The program distribution device 3 can thereby send to the in-vehicle gateway device 5 programs associated with the vehicle kind, the model year, or the grade, to which the received vehicular ID is assigned.

(2) Second reading way that a program using a program number as a key

Figure 3:
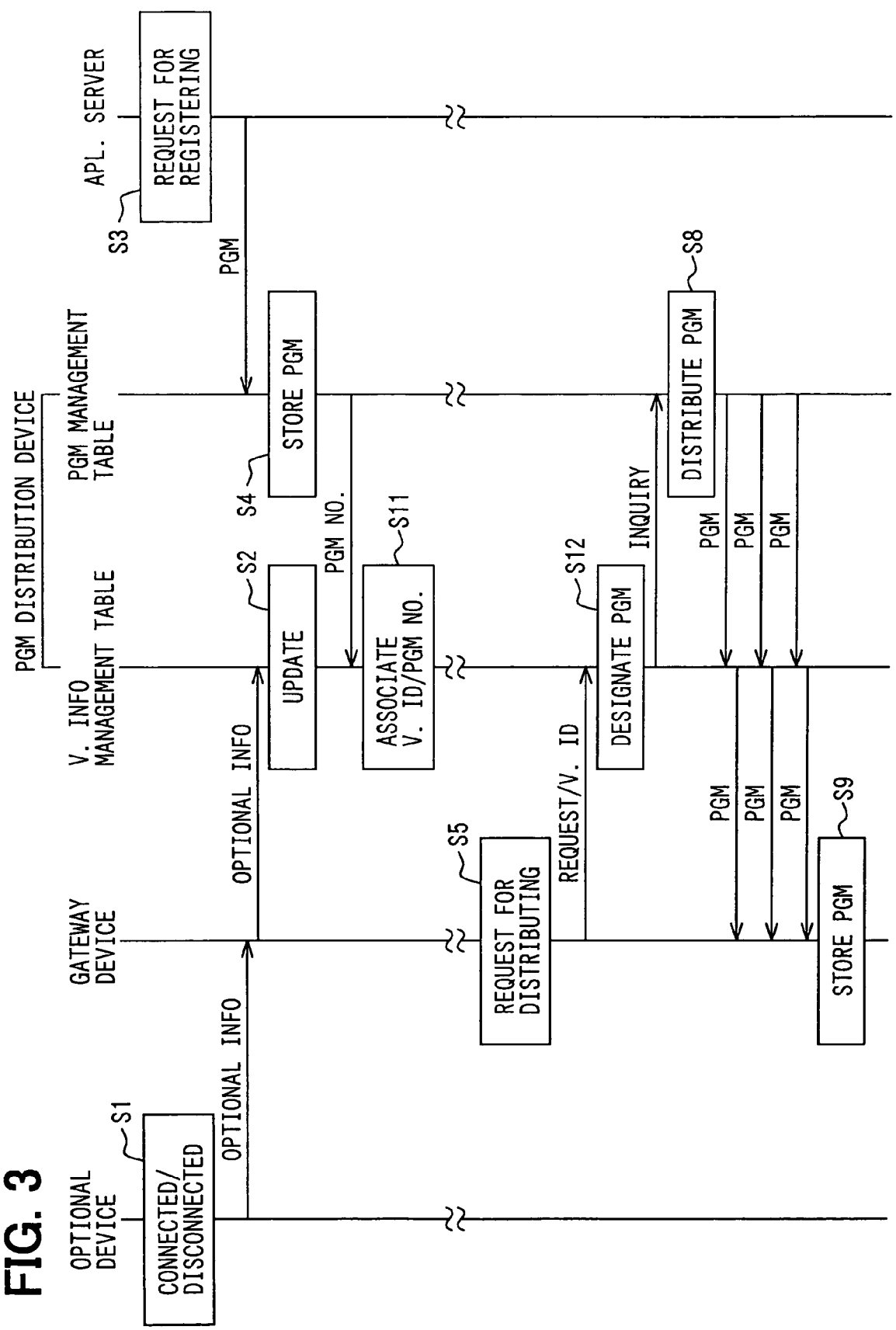
FIG. 3 is another sequence diagram according to the first embodiment.

As shown in FIG. 3, when receiving the programs from the application servers 7a to 7c, the program distribution device 3 stores the received programs (Step S4) and associates the vehicular IDs and the program numbers of the programs based on the vehicular information in the vehicular information management table 3a (Step S11).

In detail, when receiving the program 1 from the application server 7a to 7c, the program distribution device 3 associates the program number of "1" of the received program 1 with the vehicular IDs of "001," "002," and "003" in the vehicular information management table 3a by referring to the vehicular information. Further, when receiving the program 3a from the application server 7a to 7c, the program distribution device 3 associates the program number of "3a" of the received program 3a with the vehicular ID of "001" in the vehicular information management table 3a by referring to the vehicular information.

When receiving the vehicular ID as well as the request for distributing the program from the in-vehicle gateway device 5, the program distribution device 3 searches the vehicular information management table 3a using the received vehicular ID as a key to thereby designate the associated program numbers (Step S12). Next, the program distribution device 3 causes the vehicular information management table 3a to notify the program management table 3b of the designated program numbers to inquire the programs. Next, the program distribution device 3 reads out the programs corresponding to the designated vehicular ID to thereby distribute them to the in-vehicle gateway device 5 via the cell phone network or the wireless LAN network (Step S8).

In detail, suppose that the vehicle mounted with the in-vehicle gateway device 5 has a vehicular ID of "001." When receiving the vehicular ID of "001" from the in-vehicle gateway device 5, the program distribution device 3 searches the vehicular information management table 3a using the received vehicular ID of "001" to thereby designate the program numbers of "1," "2," "3a," and "4." Next, the program distribution device 3 searches the program management table 3b using the designated program numbers of "1," "2," "3a," and "4," to designate the programs (program 1, program 2, program 3a, program 4). Next, the program distribution device 3 reads out those programs 1, 2, 3a, 4 corresponding to the designated program numbers of "1," "2," "3a," and "4" to thereby distribute them to the in-vehicle gateway device 5 via the cell phone network or the wireless LAN network.

When receiving these programs from the program distribution device 3, the in-vehicle gateway device 5 executes the same process as that explained in FIG. 2.

Thus, the program distribution device 3 previously associates the vehicular IDs with the program numbers of the programs based on the vehicular information. When receiving the vehicular ID as well as the request for distributing the program from the in-vehicle gateway device 5, the program distribution device 3 associates the received vehicular ID with the program numbers and is then able to send to the in-vehicle gateway device 5 programs associated with the vehicle kind, the model year, or the grade, to which the received vehicular ID is assigned, similarly with the process in FIG. 2.

The above embodiment can be modified or expanded as follows.

Another ECU can be interfaced with the in-vehicle gateway device 5. In the above embodiment, the in-vehicle gateway device 5 executes the program distributed by the program distribution device 3; however, a program execution device that is different from the in-vehicle gateway device 5 can be provided for executing the program distributed by the program distribution device 3.

Further, it can be designed that the in-vehicle gateway device 5 and the application server 7a to 7c mutually communicate diagnosis information via the cell phone network or the wireless LAN network and the diagnosis information from the in-vehicle gateway device 5 can be reflected on the programs in the application server 7a to 7c. Further, the optional device information can be sent simultaneously with the request for distributing the program from the in-vehicle gateway device 5 to the program distribution device 3.

As explained above, in the first reading way using vehicular information as a key according to this embodiment, when receiving the request for distributing the program along with the vehicular ID from the in-vehicle gateway device 5, the program distribution device 3 searches the vehicular information management table 3a using the vehicular ID as a key to thereby designate vehicular information items (vehicle kind, model year, grade, etc.) associated with the vehicular ID. The program distribution device 3 then searches the program management table 3b using the designated vehicular information items as a key to thereby read out the designated programs from the program management table 3b and send them to the in-vehicle gateway device 5. Therefore, even when the in-vehicle gateway device 5 connects to any kind of a vehicular ECU 6, the program that corresponds to the vehicular information of the vehicle mounted with the in-vehicle gateway device 5 can be distributed to the in-vehicle gateway device 5. This enables the proper program to be distributed to the in-vehicle gateway device 5.

Further, in the second reading way using a program number as a key according to this embodiment, the program distribution device 3 previously associates the program numbers with the vehicular IDs in the vehicular information management table 3a based on the vehicular information. When receiving the request for distributing the program along with the vehicular ID from the in-vehicle gateway device 5, the program distribution device 3 searches the vehicular information management table 3a using the vehicular ID as a key to thereby designate the program numbers associated with the vehicular ID. The program distribution device 3 then reads out the programs of the designated program numbers and sends them to the in-vehicle gateway device 5. Therefore, similarly in the above first reading way, even when the in-vehicle gateway device 5 connects to any kind of a vehicular ECU 6, the program that corresponds to the vehicular information of the vehicle mounted with the in-vehicle gateway device 5 can be distributed to the in-vehicle gateway device 5. This enables the proper program to be distributed to the in-vehicle gateway device 5. Further, in this case, the vehicular ID is previously associated with the program numbers in the program management table 3b before the request for distributing the program, along with the vehicular ID, is sent by the in-vehicle gateway device 5 and received by the program distribution device 3. Therefore, the process just after the request for distributing the program, along with the vehicular ID, is sent by the in-vehicle gateway device 5 can be simplified, so that work load can be decreased.

Further, when the optional device 9 such as the audio device and the anti-theft device is disconnected or connected, the in-vehicle gateway device 5 sends the optional device information indicating that the optional device 8 is disconnected or connected, to the program distribution device 3. When receiving the optional device information, the program distribution device 3 updates the information items in the vehicular information management table 3a based on that of the received optional device information. Therefore, even when the optional device 6 is disconnected or connected with respect to the in-vehicle gateway device 5, the proper program on which the received optional device information is reflected can be distributed to the in-vehicle gateway device 5.

Second Embodiment

Figure 4:
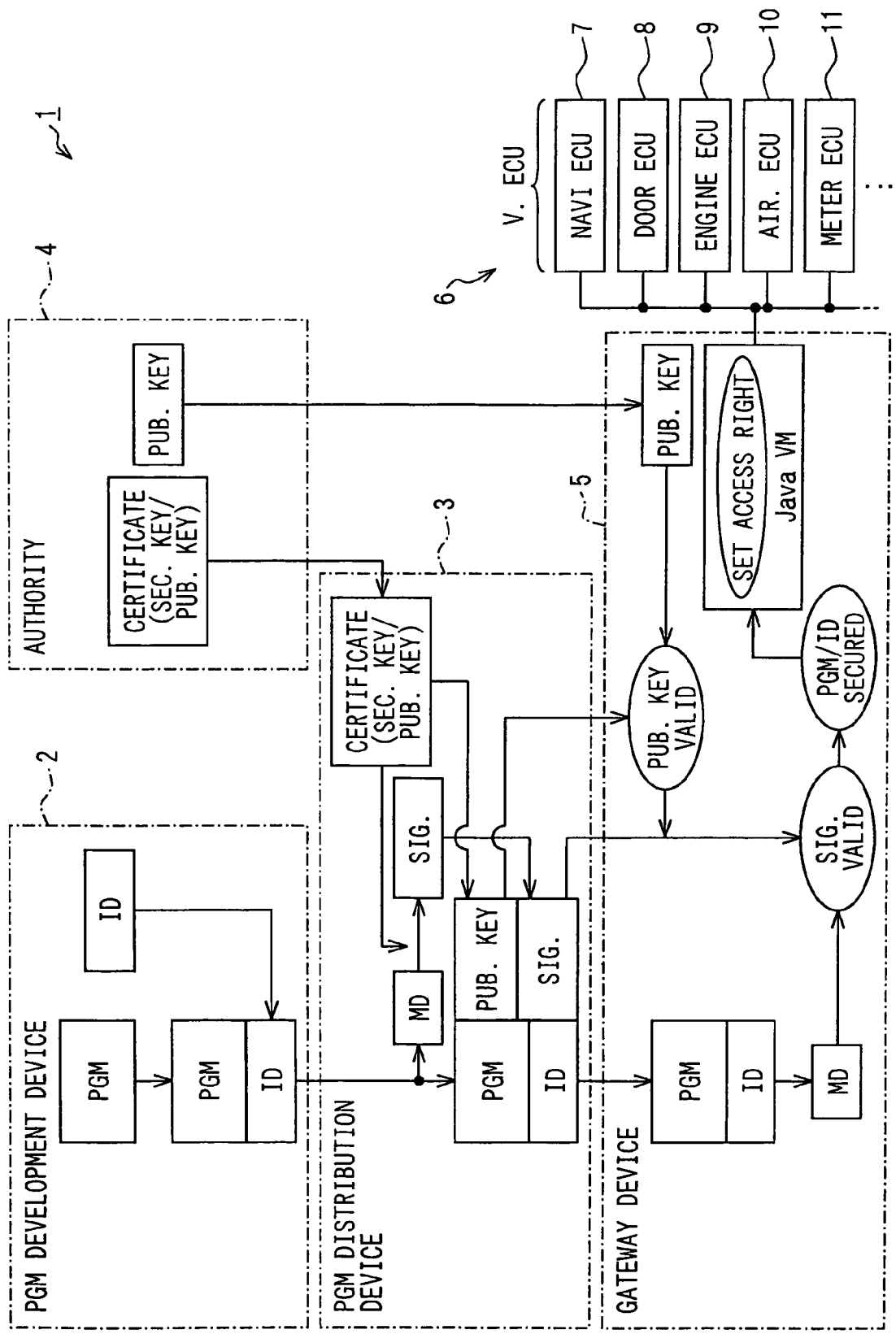
FIG. 4 is a diagram showing a schematic structure of a program distribution system according to a second embodiment of the present invention.
Figure 5:
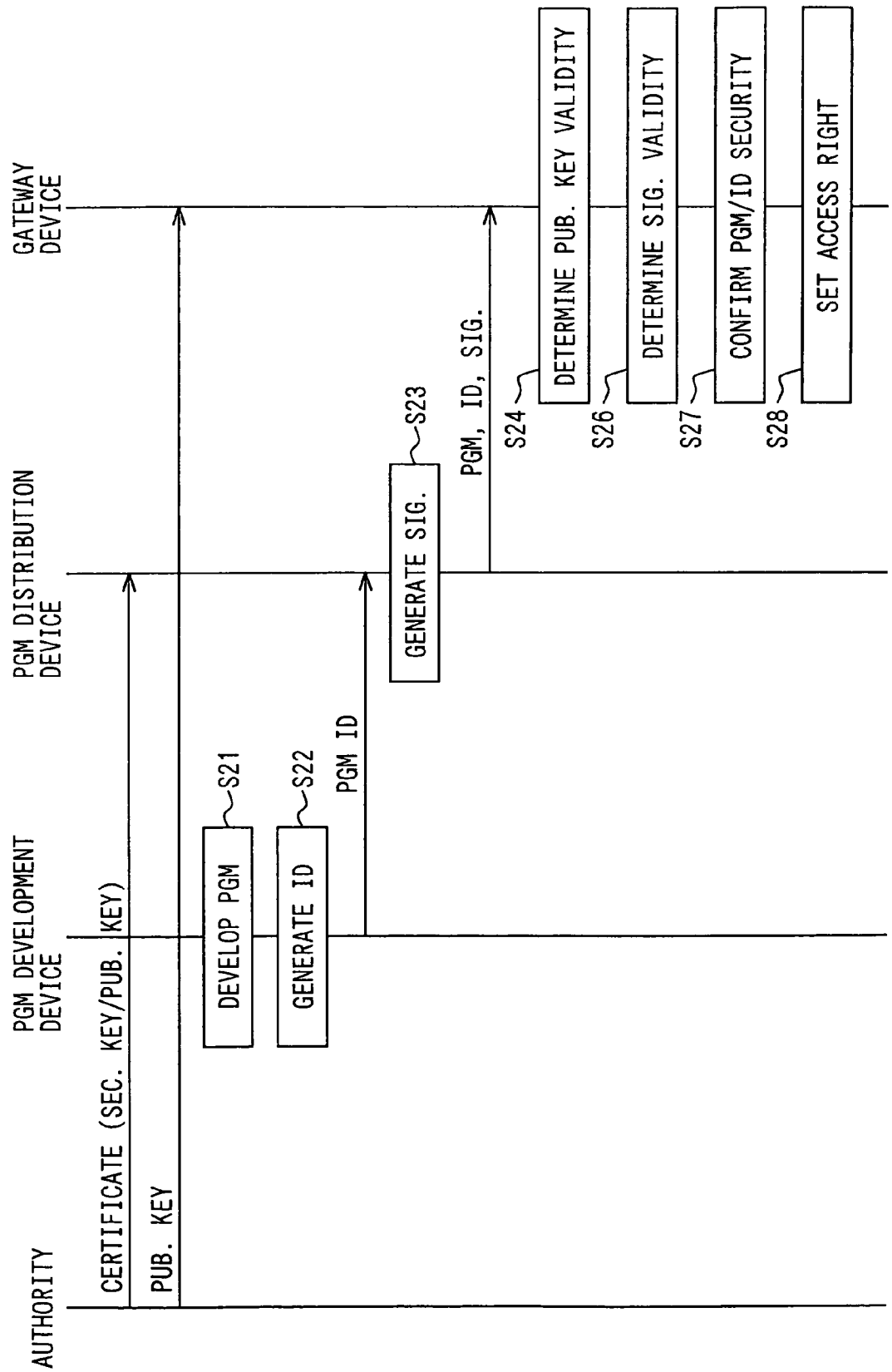
FIG. 5 is a sequence diagram according to the second embodiment.

A second embodiment of the present invention will be explained with reference to FIGS. 4 to 6. Here, a program means a program that conducts an access to a vehicular electronic control unit (ECU). A program distribution system 1 according to the embodiment includes a program development device 2, a program distribution device 3, a certificate authority 4, and an in-vehicle gateway device 5, as shown in FIG. 4.

The program development device 2 is used for a program developer (personnel or company) to mainly develop programs, and includes a personal computer or server that has a communications function for sending and receiving programs and a development environment for developing programs.

The program distribution device 3 is used for a program distributor (personnel or company) to distribute the programs mainly developed by the developer to the in-vehicle gateway device 5, and includes, e.g., a server that has a distribution function for distributing the programs. Here, the program distributor is, for instance, a party that distributes a specific application service to the public; the program developer is, for instance, a party that develops an application program necessary for distributing the specific application service to the public.

The certificate authority 4 is operated or managed by a party different from the program developer or the program distributor, and unifies management of cryptographic keys (public keys and secret keys) in a public-key cryptography. In this embodiment, the certificate authority 4 sends a certificate storing a pair of a secret key and a public key to the program distribution device 3, and sends the public key to the in-vehicle gateway device 5.

The in-vehicle gateway device 5 is mounted in a subject vehicle, and receives a program and an access right identifier from the program distribution device 3. Based on the received access right identifier, the in-vehicle gateway device 5 sets, to the received program, an access right to a vehicular ECU 6 to permit an access to a vehicular ECU 6 to which an access right is set, and prohibits the received program from conducting an access to a vehicle ECU 6 to which no access right is set. Here, the vehicular ECU 6 includes a navigation ECU 7, a door ECU 8, an engine ECU 9, an air-conditioner ECU 10, and a meter ECU 11.

Operations of the program distribution system 1 will be explained with reference to FIGS. 5, 6. An overall data flow among the program development device 2, the program distribution device 3, the certificate authority 4, and the in-vehicle gateway device 5 is shown in FIG. 5. Here, there is an assumption that a program developer is trusted while programs are developed by the program developer under a high-level quality control and is significantly reliable. Further, there is another assumption that a certificate containing a pair of a public key and a secret key is previously sent to the program distribution device 3 from the certificate authority 4, while the public key is previously sent to the in-vehicle gateway device 5 from the certificate authority 4.

The program development device 2 develops a program (Step S21); generates an access right identifier corresponding to the developed program (Step S22); provides the program with the generated identifier; and sends the program provided with the identifier to the program distribution device 3.

The program distribution device 3 receives the program provided with the identifier, and then generates a message digest (MD) from the program and the identifier using a hash algorism. The hash algorism includes MD4, MD5, SHA-1, or the like and is used for non-reversibly converting the program and the identifier to constant bit-length data. Then, the program distribution device 3 generates an electronic signature by encrypting the message digest using the secret key included in the certificate previously received from the certificate authority 4 (Step S23). The program distribution device 3 distributes to the in-vehicle gateway device 5 the program, the identifier, the electronic signature, and the public key in the certificate previously received from the certificate authority 4.

When receiving the program, the identifier, the electronic signature, and the public key of the certificate, the in-vehicle gateway device 5 determines a validity of certificate (public key) by comparing the public key received from the program distribution device 3 and the public key received directly from the certificate authority 4 (Step S24). When the in-vehicle gateway device 5 affirmatively determines the validity of the public key, the in-vehicle gateway device 5 then determines a validity of the received electronic signature. For this purpose, the in-vehicle gateway device 5 first generates a message digest from the received program and the received identifier using the same hash algorism as that used in the program distribution device 3. The in-vehicle gateway device 5 then decrypts the electronic signature distributed from the program distribution device 3 by using the verified public key (Step S26).

When the in-vehicle gateway device 5 affirmatively determines the validity of electronic signature by confirming that the generated message digest and data obtained by decrypting the received electronic signature are accorded with each other, the in-vehicle gateway device 5 confirms the safeness of the program and the identifier (Step S27). The in-vehicle gateway device 5 then sets an access right to a vehicular ECU 6 (Step S28) to thereafter permit an access to the vehicular ECU 6 to which the access right is set and to prohibit an access to the vehicular ECU 6 to which an access right is not set, based on the received access right identifier.

Here, when the program conducts an access to the vehicular ECU 6 to which the access right is not set, the in-vehicle gateway device 5 thereafter stops the access to this vehicular ECU or stops the execution of the program itself. Further, the in-vehicle gateway device 5 notifies a center of the incident or warns a user.

In the above, the certificate authority 4 is used, so that the program distribution device 3 executes a cryptographic computation by using the secret key sent from the certificate authority 4 while the in-vehicle gateway device 5 determines the valid of the public key by using the public key sent from the certificate authority 4. The reason why the certificate authority 4 is used is as follows. From a viewpoint of the in-vehicle gateway device 5, there are no problems in giving entire responsibility to the program distribution device 3 when the program distribution device 3 is fully trusted. However, suppose that the entire responsibility is given to the program distribution device 3 although the program distribution device 3 is not fully trusted. In this case, for instance, when the program distribution device 3 itself is unauthorized or not regular, there is a risk that an unauthorized access to a vehicular ECU even if the programs and the access right identifier received by the in-vehicle gateway are not altered during the distribution. Thus, the certificate authority is required to confirm that the program distribution is authorized and regular.

Consequently, in this embodiment, by using a trusted public key and secret key provided by the certificate authority 4 (at least more trusted than those by the program distribution device 3), the above problem can be prevented from occurring. Namely, whether the public key and secret key provided by the certificate authority 4 is used or not can be determined after considering a degree of reliability of the program distribution device 3 from the viewpoint of the in-vehicle gateway device 5 or a degree of security required for the system.

Further, the identifier is generated after the program is developed in the program development device 2; however, the identifier can be generated before the program is developed in the program development device 2. Furthermore, in the program development device 2, the identifier is attached to the program and the program to which the identifier is attached is sent to the program distribution device 3. However, in the program development device 2, the program and the identifier can be separately sent to the program distribution device 3; then, in the program distribution device 3, the received identifier can be attached to the separately received program.

Figure 6:
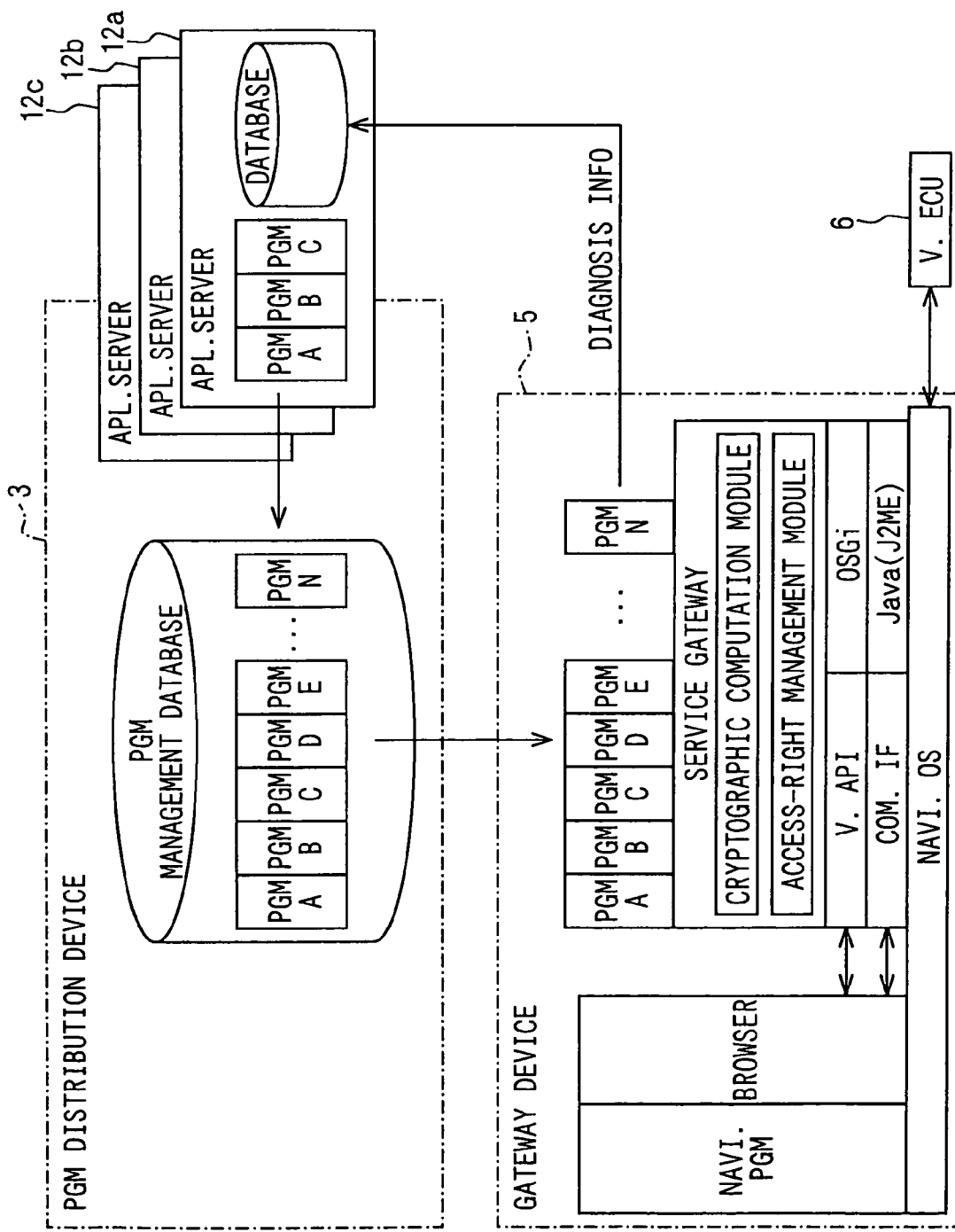
FIG. 6 is a diagram showing a schematic structure of a program distribution device and an in-vehicle gateway device according to the second embodiment.

FIG. 6 shows a schematic structure of the program distribution device 3 and the in-vehicle gateway device 5. When the program distribution device 3 receives a program from application servers 12a to 12c managed by an application service provider, the program distribution device 3 applies a cryptographic computation to the program and then manages it by storing it as a database in a program management database. Here, the functions of the application servers 12a to 12c can be assembled to the program distribution device 3, or provided in a separate unit. Further, it can be designed that the application servers 12a to 12c develop programs retrieving diagnosis information from the in-vehicle gateway device 5.

When the in-vehicle gateway device 5 receives the program and the identifier from the program distribution device 3, the in-vehicle gateway device 5 executes a cryptographic computation or the like by using a cryptographic computation module in the service gateway functions so as to confirm the safeness of the program and the identifier. The in-vehicle gateway device 5 further manages the access right using an access right management module in the service gateway functions. Here, the program distributed from the program distribution device 3 is executed along with a navigation program or a browser on an operating system in a navigation device.

As explained above, in the program distribution system 1 of this embodiment, the program distribution device 3 distributes the program to which the identifier is attached, to the in-vehicle gateway device 5. In contrast, the in-vehicle gateway device 5 sets an access right to the vehicular ECU 6 based on the distributed identifier. Therefore, permission or prohibition of the program's access to the vehicular ECU 6 can be set by the identifier. Further, in this case, the program and the identifier is distributed from the program distribution device 3 to the in-vehicle gateway device 5 using the electronic signature scheme, so that the program and the identifier can be securely protected from being altered or forged by a third party with a malicious intent. This structure thereby helps prevent the distributed program from executing an unauthorized access to the vehicular ECU, to thereby enable reliability of the program to be securely maintained.

Further, in this case, the program with the identifier distributed is distributed from the program distribution device 3 to the in-vehicle gateway device 5 by using the cryptographic key sent from the certificate authority 4. Therefore, this can help prevent a third party with a malicious intent from disguising the program distribution device 3. Further, the public key and the secret key used in the program distribution device 3 is managed by the certificate authority 4 instead of the program distribution device 3. Therefore, the program distribution system 1 can be expanded to the structure where the multiple program distribution devices 3 and the certificate authority 4 are arranged in a relation of n:1 (n: natural number).

Others

The above embodiment can be modified or expanded as follows.

Another ECU can be interfaced with the in-vehicle gateway device 5.

In the above embodiment, the in-vehicle gateway device 5 executes the program distributed by the program distribution device 3; however, a program execution device that is different from the in-vehicle gateway device 5 can be provided for executing the program distributed by the program distribution device 3.

In the above embodiment, a public-key cryptography that uses a pair of a secret key and a public key for encrypting and decrypting, respectively, is used; however, a common-key cryptography that uses only one common secret key for encrypting and decrypting can be also used for enabling the electronic signature scheme similar to the above embodiment. In this case, the secret key must be previously securely provided to the both program distribution device 3 and the in-vehicle gateway device 5 without known to a third party.

Further, in this embodiment, to reduce the load for cryptographic computation, the message digest is encrypted and the resultant electronic signature is distributed along with the program and the identifier that are in clear texts without being encrypted. However, depending on the computation capability in the sender and the recipient, the distributed program and the identifier themselves can be also encrypted by using a common-key cryptography or a public-key cryptography. In this case, when considering the load of cryptographic computation, the common-key cryptography is preferably used, instead of the public-key cryptography. Thus, this structure helps prevent not only the alteration but also eavesdropping of the program and identifier by the third party.

It will be obvious to those skilled in the art that various changes may be made in the above-described embodiments of the present invention. However, the scope of the present invention should be determined by the following claims.

What is claimed is:

1. A program distribution system comprising:
a program distribution device that distributes
a program conducting an access to a given ECU of a plurality of ECUs provided in a vehicle, and
an identifier that defines an access right to the given ECU; and
a gateway device that is provided in the vehicle and receives the distributed program and the distributed identifier,
wherein the program distribution device
generates a first digest from the program and the identifier using a converting algorism,
generates an electronic signature by encrypting the first digest using a secret key, wherein the secret key is pared with a public key in a public-key cryptography, and
distributes the generated electronic signature, the program, the identifier, and the public key, and
wherein the gateway device determines an electronic signature validity by comparing a second digest, which is generated from the received program and the received identifier using the converting algorism, with data obtained by decrypting the received electronic signature using the public key, and
wherein, when the electronic signature validity is affirmatively determined, the gateway device
sets, to the received program, an access right to the given ECU, and
prohibits the received program from conducting an access to other ECUs excluding the given ECU,
based on the received identifier.

2. The program distribution system of claim 1, further comprising:
a program execution device that executes the program distributed to the gateway device,
wherein, when the electronic signature validity is affirmatively determined by the gateway device, the program execution device
sets, to the received program, an access right to the given ECU and
prohibits the received program from conducting an access to other ECUs excluding the given ECU,
based on the received identifier, instead of the gateway device.

3. The program distribution system of claim 1, further comprising:
a certificate authority that manages a plurality of cryptographic keys in the public-key cryptography including the secret key and the public key,
wherein the certificate authority sends the secret key and the public key to the program distribution device and sends the public key to the gateway device,
wherein the program distribution device generates the electronic signature by using the secret key sent by the certificate authority, and distributes the public key along with the program, the identifier, and the electronic signature,
wherein the gateway device determines a public key validity by comparing the public key sent by the program distribution device with the public key directly sent by the certificate authority, and
wherein, when the public key validity is affirmatively determined, the gateway device determines the electronic signature validity.

4. A gateway device that is provided in a vehicle and is used along with a program distribution device in a program distribution system,
wherein the program distribution device that distributes
a program conducting an access to a given ECU of a plurality of ECUs provided in the vehicle, and
an identifier that defines an access right to the given ECU,
wherein the program distribution device
generates a first digest from the program and the identifier using a converting algorism,
generates an electronic signature by encrypting the first digest using a secret key, wherein the secret key is pared with a public key in a public-key cryptography, and
distributes the generated electronic signature, the program, the identifier, and the public key,
the gateway device comprising:
signature determining means that determines an electronic signature validity by comparing a second digest, which is generated from the received program and the received identifier using the converting algorism, with data obtained by decrypting the received electronic signature using the public key; and
access setting means that
sets, to the received program, an access right to the given ECU and prohibits the received program from conducting an access to other ECUs excluding the given ECU, based on the received identifier when the electronic signature validity is affirmatively determined.

5. The gateway device of claim 4,
wherein the program distribution system further includes a program execution device that
executes the program distributed to the gateway device and
includes the access setting means, instead of the gateway device.

6. The gateway device of claim 4,
wherein the program distribution system further includes a certificate authority that manages a plurality of cryptographic keys in the public-key cryptography including the secret key and the public key,
wherein the certificate authority sends the secret key and the public key to the program distribution device and sends the public key to the gateway device,
the gateway device further comprising:
key validity determining means that determines a public key validity by comparing the public key distributed from the program distribution device with the public key sent directly by the certificate authority,
wherein, when the public key validity is affirmatively determined, the signature determining means determines the electronic signature validity.

7. A program distribution system comprising:
a program distribution device that distributes
   a program conducting an access to a given ECU of a plurality of ECUs provided in a vehicle and
   an identifier that defines an access right to the given ECU; and
a gateway device that is provided in the vehicle and receives the distributed program and the distributed identifier,
wherein the program distribution device includes
   signature generating means that generates an electronic signature that is generated based on the program and the identifier by using a cryptography and enables the gateway device to confirm that the program and the identifier are distributed without being altered from the program distribution device; and
   signature attaching means that distributes, along with the program and the identifier, at least the electronic signature, and
wherein the gateway device including:
   signature validity determining means that determines an electronic signature validity regarding the received electronic signature; and
   access setting means that
     sets, to the received program, an access right to the given ECU, and
     prohibits the received program from conducting an access to other ECUs excluding the given ECU, based on the received identifier, when the electronic signature validity is affirmatively determined.

8. The program distribution system of claim 7,
wherein the electronic signature uses a public-key cryptography having a pair of a secret key and a public key,
wherein the program distribution device further includes:
   first digest generating means that generates a first digest from the program and the identifier using a converting algorism, wherein the electronic signature is generated by encrypting the first digest using the secret key, and
wherein the gateway device further includes:
   second digest generating means that generates a second digest from the received program and the received identifier using the converting algorism, wherein the electronic signature validity is determined by comparing the second digest with data obtained by decrypting the received electronic signature using the public key.

9. The program distribution system of claim 8, further comprising:
a certificate authority that manages a plurality of cryptographic keys in the public-key cryptography including the secret key and the public key,
wherein the certificate authority sends the secret key and the public key to the program distribution device and sends the public key to the gateway device,
wherein the electronic signature is generated by using the secret key sent by the certificate authority, and the public key sent by the certificate authority is distributed along with the program, the identifier, and the electronic signature,
wherein the gateway device further includes:
   key validity means that determines a public key validity by comparing the public key sent by the program distribution device with the public key directly sent by the certificate authority, wherein the signature validity is determined when the public key validity is affirmatively determined.

10. The program distribution system of claim 7,
wherein the electronic signature uses a public-key cryptography having a pair of a secret key and a public key,
wherein the electronic signature is generated by encrypting the program and the identifier using the secret key, and the program and the identifier, both of which are encrypted, are distributed as the generated electronic signature, and
wherein the electronic signature validity is determined by checking data obtained by decrypting the received electronic signature using the public key.

11. The program distribution system of claim 7,
wherein the electronic signature uses a common-key cryptography having a common secret key that is previously provided to the distribution device and the gateway device without known to a third party,
wherein the program distribution device further includes:
   first digest generating means that generates a first digest from the program and the identifier using a converting algorism, wherein the electronic signature is generated by encrypting the first digest using the secret key, and
wherein the gateway device further includes:
second digest generating means that generates a second digest from the received program and the received identifier using the converting algorism, wherein the electronic signature validity is determined by comparing the second digest with data obtained by decrypting the received electronic signature using the secret key.

12. The program distribution system of claim 7,
wherein the electronic signature uses a common-key cryptography having a common secret key that is previously provided to the distribution device and the gateway device without known to a third party,
wherein the electronic signature is generated by encrypting the program and the identifier using the secret key, and the program and the identifier, both of which are encrypted, are distributed as the generated electronic signature, and wherein the electronic signature validity is determined by checking data obtained by decrypting the received electronic signature using the secret key.

13. A method of distributing a program for conducting an access to a given ECU of ECUs provided in a vehicle and an identifier that defines an access right to the given ECU, from a program distribution device to a gateway device provided in the vehicle, the method comprising steps of:

generating an electronic signature based on the program and the identifier by using a cryptography, wherein the electronic signature enables the gateway device to confirm that the program and the identifier are distributed without being altered from the program distribution device;

distributing at least the generated electronic signature, along with the program and the identifier from the program distribution device to the gateway device;

determining a validity of the received electronic signature; and setting to the received program, an access right to the given ECU based on the received identifier, when the validity of the electronic signature is affirmatively determined in the gateway device; and prohibiting the program from conducting an access to other ECUs excluding the given ECU based on the received identifier, when the validity of the electronic signature is affirmatively determined in the gateway device.

\* \* \* \* \*